US006200016B1

(12) United States Patent
Reinemuth et al.

(10) Patent No.: US 6,200,016 B1
(45) Date of Patent: Mar. 13, 2001

(54) BAFFLE ASSEMBLY FOR A MIXING VESSEL

(75) Inventors: Jurgen Reinemuth, Weinheim (DE); Franklyn J. Amorese, Hilton, NY (US)

(73) Assignee: Pfaudler-Werke GmbH, Schwetzingen (DE)

( * ) Notice: Subject to any disclaimer, the term of this patent is extended or adjusted under 35 U.S.C. 154(b) by 0 days.

(21) Appl. No.: 09/226,494

(22) Filed: Jan. 7, 1999

(30) Foreign Application Priority Data

Feb. 9, 1998 (EP) ................................................ 98102236

(51) Int. Cl.[7] ................................ B01F 15/00; F16B 4/00
(52) U.S. Cl. ........................... 366/302; 403/273; 422/228
(58) Field of Search ..................................... 366/142, 302, 366/306, 307, 331; 422/228; 403/273

(56) References Cited

U.S. PATENT DOCUMENTS

| | | | | |
|---|---|---|---|---|
| 1,718,745 | * | 6/1929 | Laing | 366/306 |
| 2,108,482 | * | 2/1938 | Greene . | |
| 3,265,368 | * | 8/1966 | Nocera . | |
| 3,334,870 | * | 8/1967 | Kropp et al. . | |
| 3,691,938 | * | 9/1972 | Nichols | 366/302 |
| 3,935,740 | * | 2/1976 | Whitney . | |
| 4,221,488 | * | 9/1980 | Nunlist et al. | 366/343 |
| 4,264,215 | * | 4/1981 | Nunlist et al. . | |
| 4,314,396 | * | 2/1982 | Nunlist et al. | 403/273 |
| 4,508,455 | * | 4/1985 | Lerman et al. . | |
| 4,576,089 | * | 3/1986 | Chauvin . | |
| 4,601,583 | * | 7/1986 | Amorese . | |
| 4,606,103 | * | 8/1986 | Koehl et al. . | |
| 4,854,712 | * | 8/1989 | Mori . | |
| 4,993,593 | * | 2/1991 | Fabiano et al. . | |
| 5,582,799 | * | 12/1996 | Amorese et al. | 422/118 |

FOREIGN PATENT DOCUMENTS

| | | | |
|---|---|---|---|
| 3007718 A1 | | 9/1980 | (DE) . |
| 0145370 | | 6/1985 | (EP) . |
| 1122714 | | 8/1968 | (GB) . |
| 3229629 | * | 10/1991 | (JP) . |

* cited by examiner

*Primary Examiner*—Tony G. Soohoo
(74) *Attorney, Agent, or Firm*—Michael L. Dunn

(57) ABSTRACT

A baffle assembly for flow disruption comprising a glass coated baffle. A hollow end of the baffle engages with a connector. An interior tubular portion of the connector is glass coated and forms an interference fit with the glass coated hollow end of the baffle.

20 Claims, 6 Drawing Sheets

BAFFLE ASSEMBLY FOR A MIXING VESSEL

The present invention relates to a baffle assembly for disrupting flow in a mixing vessel. Generally, the invention relates to disruption baffles in reactor vessels used in the chemical processing industry. Such vessels and baffles are often glass or enamel coated but may also be made of refined stainless steels.

FIG. 1*a* shows a conventional standard vessel used for example in the chemical or pharmaceutical industry for various operations such as reacting, mixing, gasification, stirring, etc. Due to the potentially corrosive or abrasive ingredients mixed, such vessels are often designed to have a glass coating on all components exposed to the materials being treated. As shown in FIG. 1*a*, the vessel wall 2, the blade agitator 1 and the baffle member 4 are all coated with glass or enamel layers as is well known in the present art. The conventional baffle assembly shown in FIG. 1*a* comprises the elongate baffle member 4 fixed to a flange 5, the flange 5 being connected by conventional means to the vessel port 6. Alternatively, conventional baffles are secured to the vessel port 6 in a stuffing box type arrangement. Sealing members of the stuffing box are urged into sealing engagement with the external surface of the baffle member. The flange assembly is applied from above the vessel, while the baffle member is inserted from within the vessel into the vessel port 6.

FIG. 1*b* shows another conventional baffle assembly as disclosed in the European Patent EP-B 0 614 694. The baffle 4 comprises an outer tube with an inner tube 7 disposed coaxially therein. The inner tube 7 can carry sampling means as shown in FIG. 1*b* in the form of a plastic pipe 8 extending from the bottom of the double tube construction. This conventional baffle also comprises temperature sensor means located between the inner and outer tube walls as shown at reference numeral 9.

The conventional baffles of FIG. 1 are assembled by insertion from the top of the vessel through the port 6 and subsequent fixation of the flange 5 to a counter flange of the port 6. Such baffles are inserted in inclined manner when the diameter of the port allows, however, considerable overhead space must be present at the assembly site. In addition, the cross-sectional dimensions of the baffle member cannot exceed the inner diameter of the port 6.

An object of the present invention is to provide an improved baffle assembly which minimizes overhead space requirements and allows flexibility in the selection of the shape and size of the baffle member itself.

According to the present invention, a baffle assembly is provided for flow disruption in a mixing vessel as defined in claim 1. The elongate glass coated baffle member has a hollow end for interconnection to a connector piece. The connector has a glass coated tubular portion and is adapted to be secured to the mixing vessel. The hollow end of the baffle and the tubular portion of the connector engage coaxially in a frictional fit. The frictional engagement is provided by an interference fit connection.

Employing the present baffle assembly, the baffle member as a separate part can be placed inside the vessel through the manhole. Larger dimensions and various configurations of the baffle can therefore be employed. The hollow end of the baffle may be extended from the inside of the vessel into the port opening and connected to the connector piece assembled from above. The overhead space required is only that necessary to attach the connector to the hollow end of the baffle extending through the port. The releasable frictional fit of the baffle member and the connector therefore allow complete flexibility in the selection of the baffle configuration.

Further objects and advantages of the present invention will become apparent from the following description of embodiments taken in conjunction with the drawings.

DETAILED DESCRIPTION

Figure 1A:
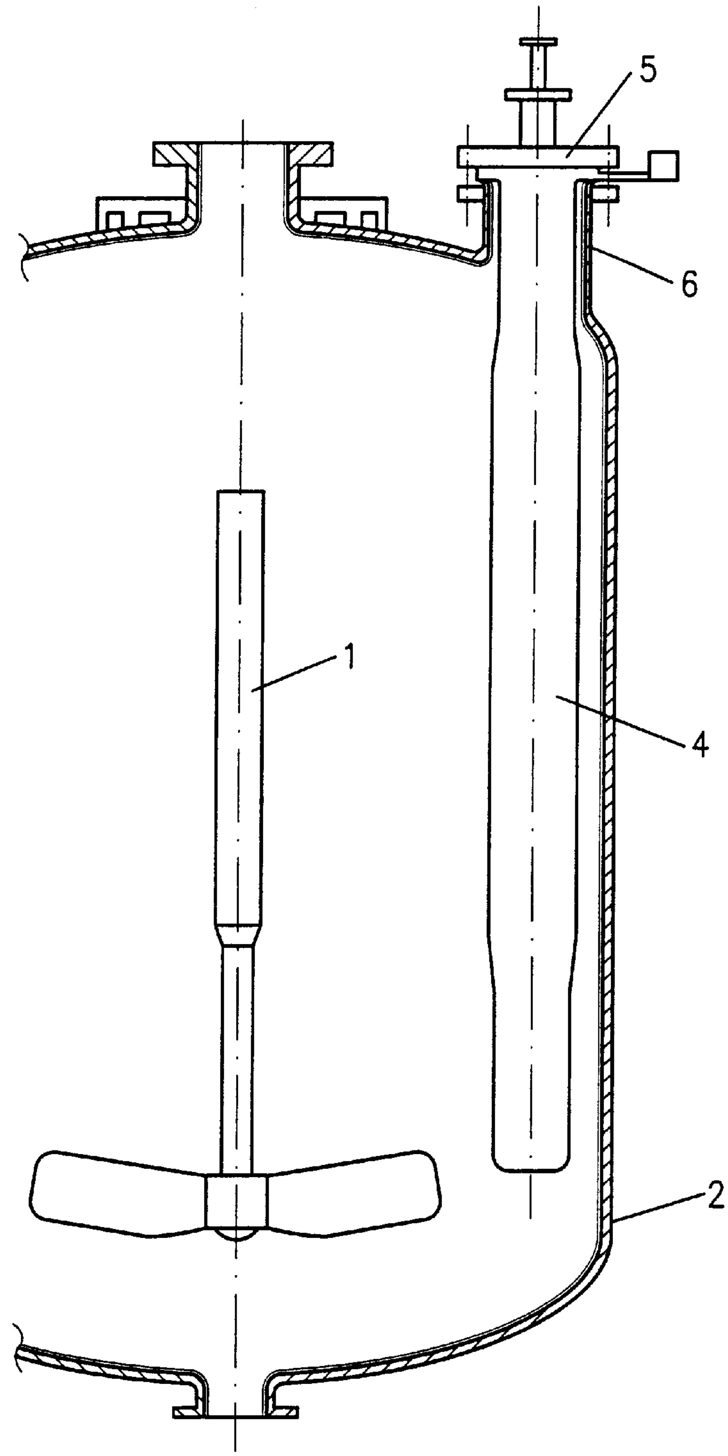
FIGS. 1*a* and 1*b* show conventional arrangements of a baffle assembly.
Figure 2:
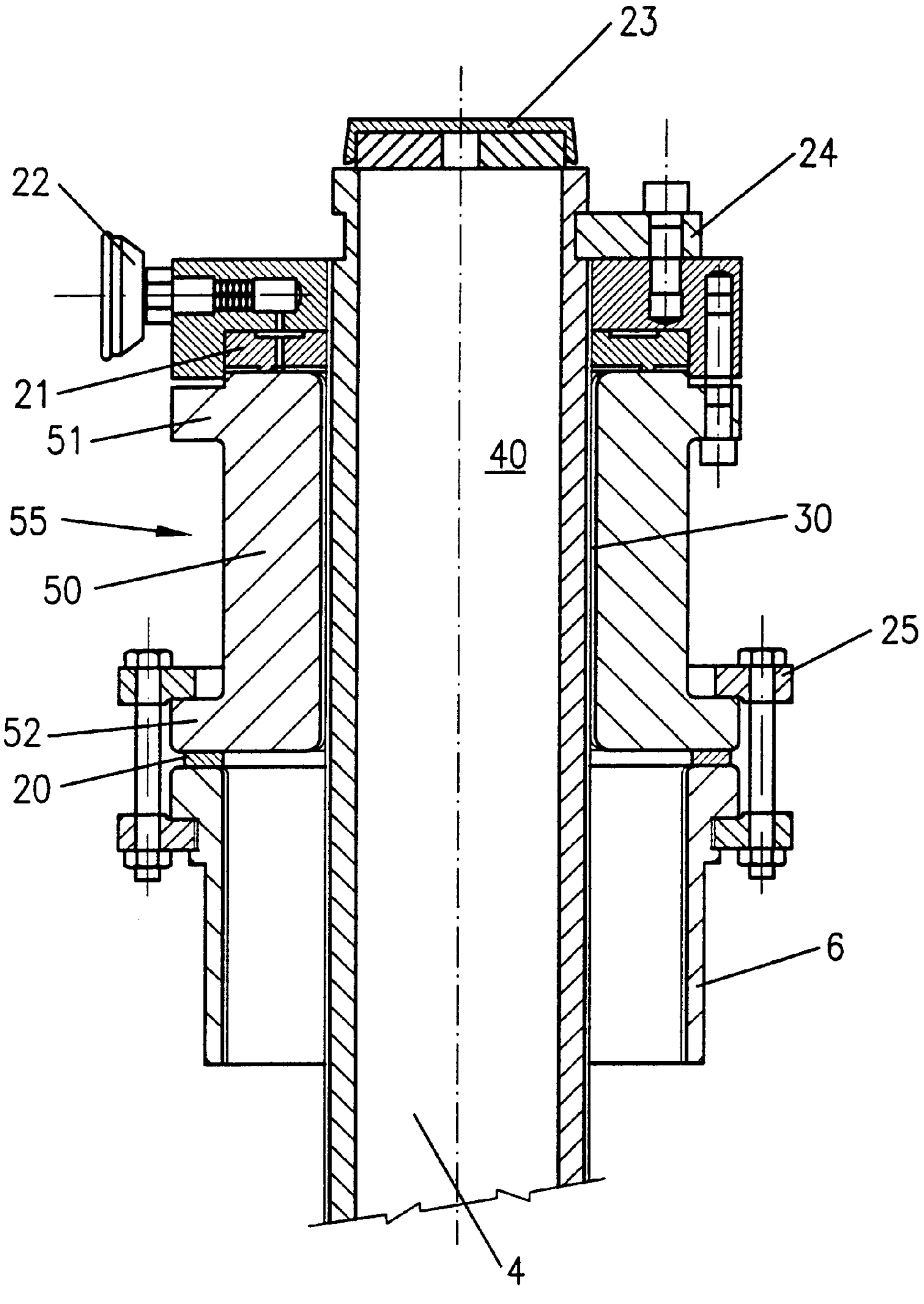
FIG. 2 shows an embodiment of the present invention in which the baffle is connected to a flange collar.

A preferred embodiment of the present invention is shown in FIG. 2, where the baffle assembly comprises the baffle member 4 having a hollow end 40 interconnected to a flange collar 55 as the connector piece. The baffle member 4 is indicated as being a hollow tube, however, no restrictions are made on the configuration or dimensions of same. The baffle member 4 may also comprise the coaxially arranged dual tube construction as shown in FIG. 1*a*. Important for this embodiment is only that the baffle comprise a hollow end as shown by reference numeral 40 in FIG. 2.

The flange collar 55 comprises a tubular or cylindrical portion 50 extending axially in the same direction as the baffle tube. The collar 55 comprises upper and lower flanges 51, 52, the lower flange 52 adapted for connection to the vessel port 6. In FIG. 2, a lapped flange 25 is secured to the port 6 with a flat sealing 20 provided therebetween. The upper flange 51 of the collar is provided with a reserve seal 21 which acts only as a safety seal. The interference connection of the collar 55 with the hollow end 40, to be discussed below, provide a completely gas-tight sealing of the baffle. No further sealing members are required. A sensor 22 in the form of a manometer is provided in conjunction with the reserve seal 21. The sensor 22, as a safety measure, would detect any pressure increase should the interference fit connection fail.

The glass coated external surface of the hollow end 40 is engaged with the internal glass coated surface of the tubular portion 50 by means of an interference fit. Such a connection can be achieved for example by supercooling the hollow end 40 with liquid nitrogen or the like, whereafter it is inserted from within the vessel into the collar. Alternatively, the collar alone can be heated or the collar 50 could be heated and the hollow end 40 cooled as mentioned above. The outside diameter of the hollow end 40 is dimensioned with respect to the inside diameter of the collar such that the contraction upon cooling of the end 40 allows its passage through the collar 50. As the hollow end returns to normal ambient temperature, its diameter expands to form the glass-to-glass interference fit with the tubular portion 50 as indicated by the reference numeral 30. The interference fit provides an air-tight seal of the baffle member.

In the present embodiment, in order to cool only the end of the baffle, a closure device such as a plug or stop (not shown in FIG. 2) is inserted into the hollow end 40 and disposed at a position below where the collar is to be connected. Liquid nitrogen is then poured into the hollow end from above, whereby only the upper end of the baffle member is cooled. After contraction upon cooling, the liquid nitrogen is removed or evaporated. The closure device may be left in the hollow end or removed depending on the type of baffle employed.

The above fitting procedure is performed when the collar 55 is already secured to the port 6 by means of the lower flange 52. The reserve seal 21 mentioned above is then assembled which includes the leak detector 22.

In addition, a safety element 24 is engaged with a groove on the exterior of the hollow end 40 as shown in FIG. 2. The safety lock would prevent the baffle 4 from falling into the vessel, should the frictional connection fail for any reason. In addition, in high pressure vessels, the safety lock would prevent the baffle from being urged out of the vessel, should the connection fail.

The safety element 24 forms a metal to metal connection with the groove in the hollow end 40 as shown in FIG. 2. Should a voltage build up occur for any reason on the baffle 4, it would be carried off by the safety element 24 to the collar 55 and then via the lapped flange 25 to the port 6. In view of the fact that such vessels are provided with electrical grounding, any such voltage build up would be reliably grounded via the metal to metal connection of the baffle 4 to the vessel wall by means of the port 6.

Figure 1B:
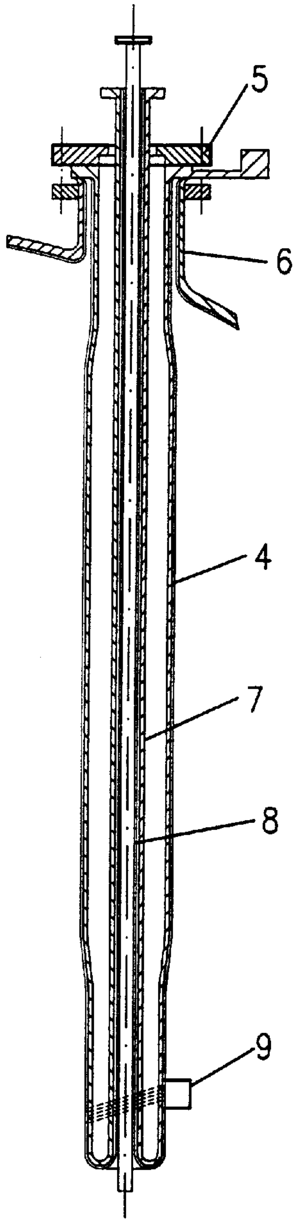

As mentioned above, the baffle element 4 may comprise the dual tube arrangement as shown in FIG. 1*b*. In this case, the protective cap 23 would be removed from the hollow end 40 and appropriate sample taking equipment or measuring devices can be inserted into the interior of the baffle 4. In the simpler arrangement of the baffle shown in FIG. 1*a*, measuring equipment can simply be inserted from above into the interior of the baffle member.

A preferred embodiment of the present invention would comprise the multipurpose baffle having measuring devices. These may include a temperature sensing device 9, a sample taking device 8 and/or a pH measuring device. A temperature sensor or pH sensor may be located on a surface of the baffle which is in contact with the medium in the reactor vessel. In a preferred embodiment, the electrical wiring to be supplied to such sensors is embedded within the enamel or glass coating of the baffle. This will normally be on an exterior surface of the baffle, such that the wiring will run within the coating on the external surface of the hollow end 40 of the baffle.

The cross-section of the hollow end 40 as shown in the embodiment of FIG. 2 is preferably circular, the hollow end thereby taking on a cylindrical shape, which matches the cylindrical shape of the inner surface of the tubular portion 50. Other configurations are possible, for example the cross-section could be oval or polygonal.

The interference fit of the present invention can also be formed in other ways. For example, the seat formed by the collar 55 can be defined as a slightly frustoconical surface. In this case, the hollow end 40 of the baffle 4 is urged into the collar by an axial force from the interior of the vessel. No heating or cooling of the respective elements is required for assembly. To disassemble the elements, the outer collar could be heated or the interior hollow end be cooled or both. Another alternative would be to provide the inner surface of the collar with a slight crowning. The tubular section 50 would then have an interior surface of slight hourglass shape. The hollow end 40 can be inserted into the collar by axial force from below as in the case mentioned above.

As will be apparent from above, an important aspect of the invention is that an interference fit is formed, where alternative means and methods are available for forming such a fit. The baffle assembly itself comprises only two components which are releasably connected to one another without any further fastening or sealing means.

Figure 3:
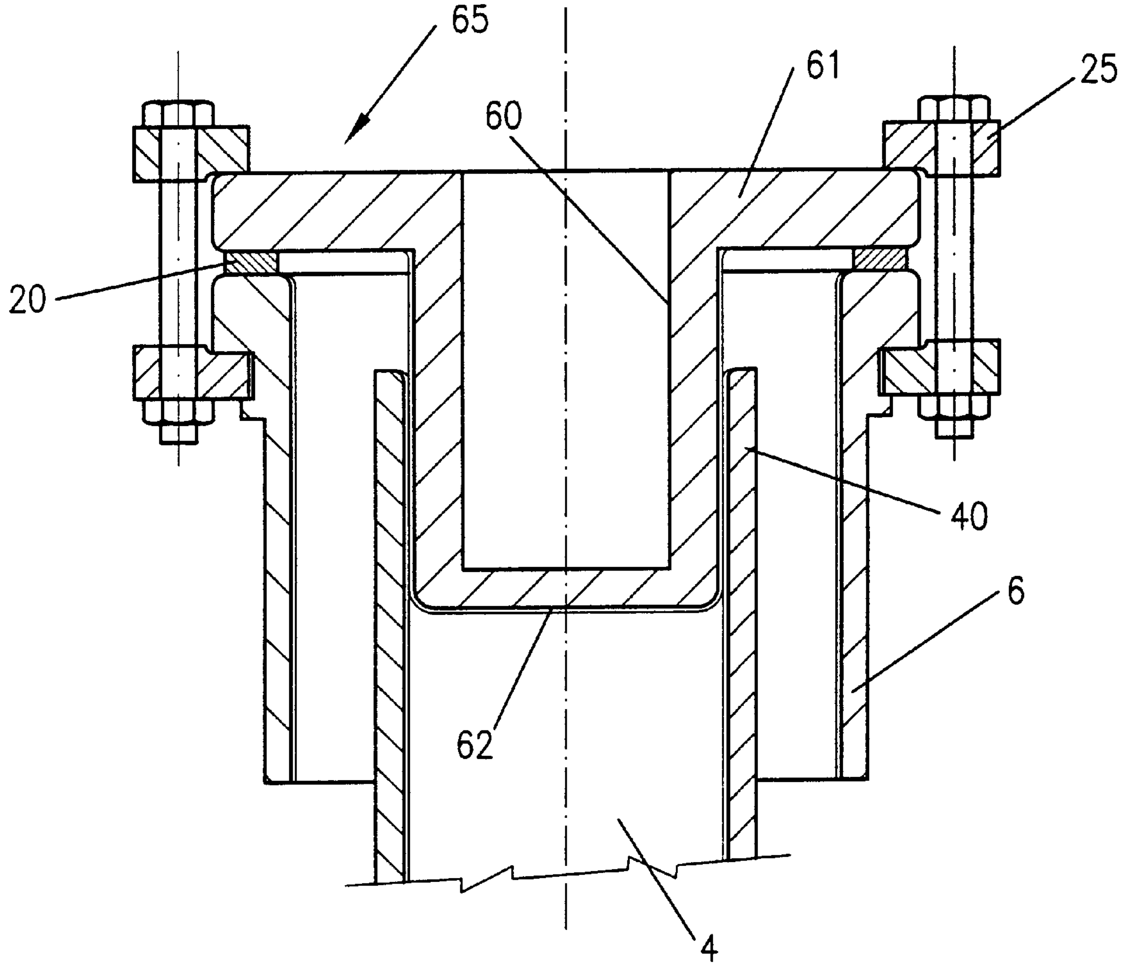
FIG. 3 shows another embodiment of the invention in which the connector piece extends to the inside of the baffle member.

A further embodiment of the present invention is shown in FIG. 3. The baffle end 40 is provided with a glass coating on its interior surface. The connector piece 65 comprises a tubular or pipe section 60 joined to a plate-like flange 61. The pipe section 60 forms the tubular portion, the external surface of which is glass coated. The pipe section 60 may have a closed bottom end 62 as shown in FIG. 3. This arrangement is preferable when the baffle member itself carries out the single function of flow disruption.

On the other hand, the pipe section 60 can be provided with an open bottom end through which a sampling tube and/or connections to measuring devices, such as pH sensors and temperature sensors can be provided. The upper end of the pipe section 60 will be open for connection to data processing means above the baffle plate 61.

In the embodiment in FIG. 3, the assembly of the interference fit between the baffle end 40 and the pipe section 60 is somewhat simplified. The baffle member 4, as in the previous embodiment, may be of larger dimension than the inside diameter of the vessel port 6. The baffle is placed inside the vessel by means of the manhole and the end 40 is inserted into the opening of the port 6. The connector piece 65 is previously cooled, for example by placing liquid nitrogen in the pipe section 60 with its closed bottom 62. When sufficiently cooled and contracted, the pipe section 60 is then inserted into the hollow end 40 and allowed to slowly heat up to ambient temperature. The accompanying expansion of the pipe section 60 then produces the interference fit with the interior of the baffle end 40. Disassembly of the connection is achieved by following the procedure in reverse.

Figure 4A:
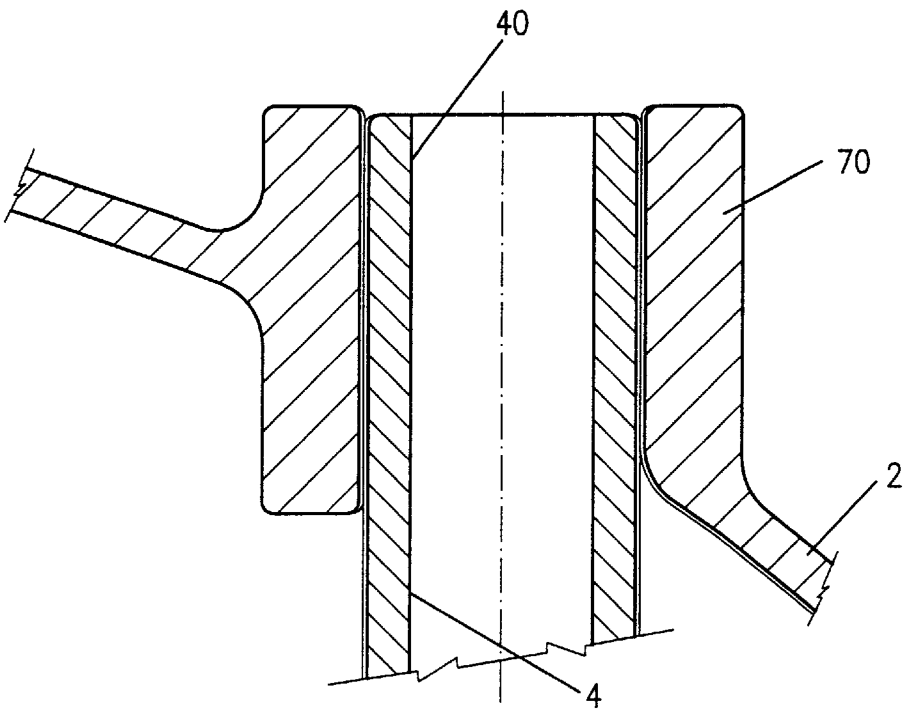
FIGS. 4*a* and 4*b* show still further embodiments in which the baffle member is connected to a hub integrated into the vessel wall.
Figure 4B:
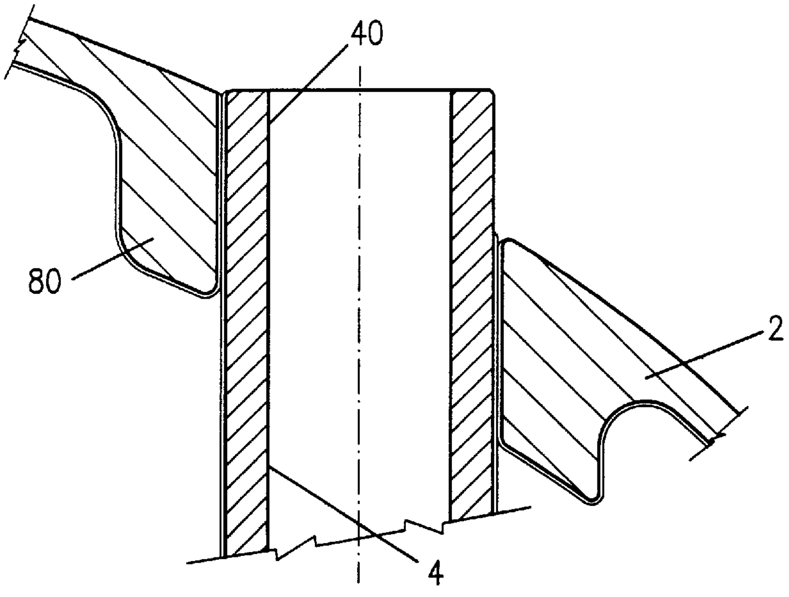

Further embodiments of the present invention are shown in FIGS. 4*a* and 4*b*. The connector element is formed as a hub 70, 80, which is integrated into the vessel wall 2, for example by welding. The bore of the hub is glass coated along with the interior of the vessel and forms a tubular portion. Having been placed within the vessel through the manhole, the baffle end 40 can be placed just below the hub 70 and the cooling medium is supplied to the hollow end from above the vessel. In the cooled condition, the baffle end 40 is then raised and inserted into the hub and allowed to return to normal ambient temperatures. For a simple baffle arrangement, the top end 40 can be closed with a protective cap. For baffles with measuring and sampling equipment, the hollow end 40 can be extended further out of the vessel for attachment of the corresponding data analysis and processing units.

Figure 5A:
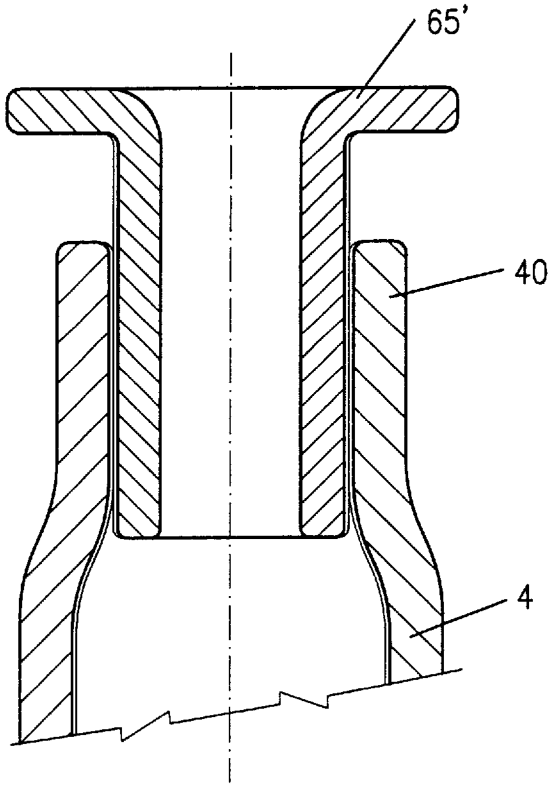
FIGS. 5*a* and 5*b* illustrate further embodiments of the connection between the baffle member and the connector element.
Figure 5B:
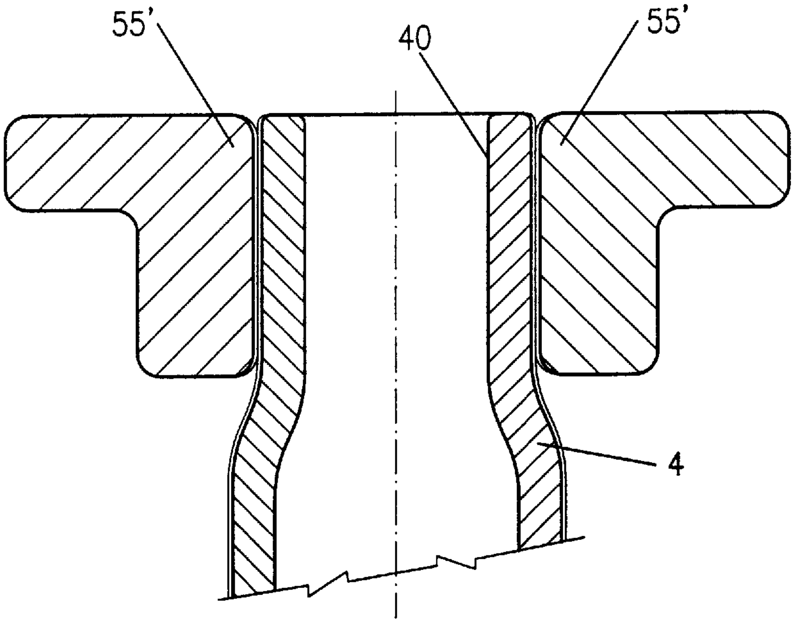

FIGS. 5*a* and 5*b* show further embodiments of the two-piece baffle assembly according to the present invention. In FIG. 5*a*, the connector piece 65' comprises a flanged upper end, while the opposite (lower) end of the connector remains open. The hollow end 40 has a smaller diameter than the main section of the baffle 4. In FIG. 5*b*, the connector piece 55' comprises a hub with an enlarged upper flanged portion. The hollow end 40 is again of smaller diameter than the main body of the baffle 4, however, in this case the connector 55' encompasses the hollow end 40.

The baffle assembly of the present invention preferably also comprises agitator elements or arms 12 affixed to the baffle body 4 as shown in FIGS. 6*a*–6*f*. Normally, such elements are conventionally connected to the main body by the use of securement means including brackets mechanically fixed by screws and/or bolts. According to the present embodiment, the agitation disruption elements are secured by means of an interference fit of the hub portion 12 of the elements with the body portion 4 of the baffle. The interference fit can be provided by the means discussed above, whereby the assembly will take place within the vessel itself. The hub portion 12 can be heated and then passed over the exterior surface of the baffle 4. The baffle body 4 can be cooled, for example with liquid nitrogen, whereafter the hub portion 12 is passed over the baffle body 4. A combination of these two techniques is also possible.

Figure 6A:
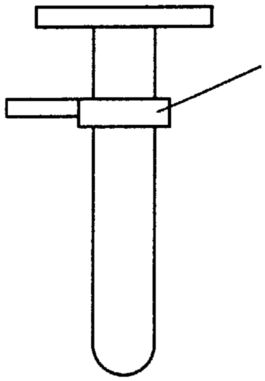
FIGS. 6*a* to 6*f* illustrate embodiments in which agitator elements are secured to the baffle.
Figure 6B:
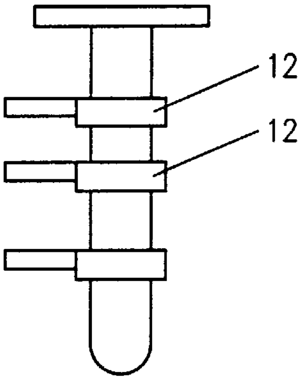
Figure 6C:
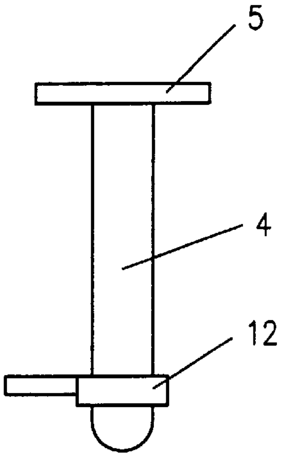
Figure 6D:
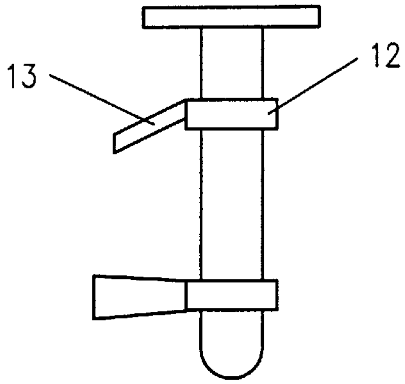
Figure 6E:
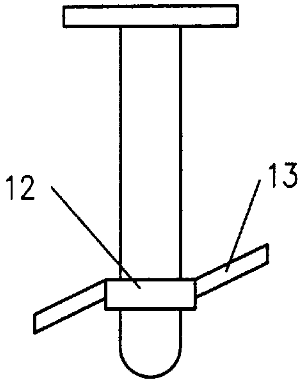
Figure 6F:
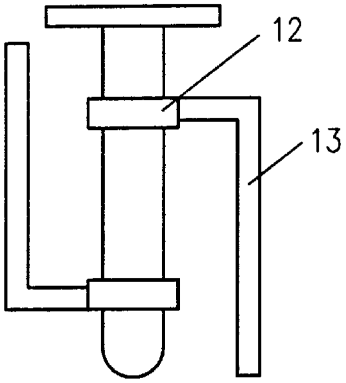

As can be seen from FIGS. 6*a*, 6*b* and 6*c*, the number and disposition of the agitator elements can be freely selected. As shown in FIGS. 6*d*, 6*e* and 6*f*, the arm portions 13 of the agitator elements can also be variously selected.

As will be apparent, the form and position of the agitator arms can be selected depending on the particular requirements of the mixing or reaction process taking place within the vessel.

As can be taken from the above embodiments, a particularly simple interconnection of the baffle assembly elements is provided. No flange plates and flange connections are necessary for securement to the reactor vessel.

In all of the embodiments, a significant improvement is achieved in that the geometrical shape and dimensions of the baffle member are no longer dependent on the inside diameter of the conventional port. The invention thus opens up a new flexibility in the design of baffle elements for any particular application.

What is claimed is:

1. A baffle assembly for flow disruption in a mixing vessel, comprising:

an elongate glass-coated baffle having a hollow end, a connector having a glass-coated tubular portion, the connector being securable to the mixing vessel, wherein the hollow end and the tubular portion are coaxially engaged in an interference fit connection, said connection forming an air-tight seal without further sealing means.

2. The assembly of claim 1, wherein the connector comprises a flange collar, an interior of said portion thereof engaging with the external glass-coated surface of the hollow end of said baffle.

3. The assembly of claim 2, wherein the flange collar comprises a first flanged end for securement to the mixing vessel and a second flanged end to which a safety element is fixed, the safety element being engaged in metal-to-metal contact with said hollow end of the baffle, wherein said metal-to-metal contact provides an electrical conduction path from the baffle to a grounded vessel wall.

4. The assembly of claim 3, wherein one or more agitator elements are disposed on said elongate baffle, the agitator elements being secured to the baffle body in an interference fit connection.

5. The assembly of claim 2, wherein one or more agitator elements are disposed on said elongate baffle, the agitator elements being secured to the baffle body in an interference fit connection.

6. The assembly of claim 1, wherein the connector comprises a pipe section as said tubular portion fixed at one end to a flange plate, an external glass-coated surface of the pipe being engaged with an internal glass-coated surface of the hollow end of said baffle.

7. The assembly of claim 6, wherein an end of the pipe opposed to the flange plate is open or closed.

8. The assembly of claim 7, wherein one or more agitator elements are disposed on said elongate baffle, the agitator elements being secured to the baffle body in an interference fit connection.

9. The assembly of claim 6, wherein one or more agitator elements are disposed on said elongate baffle, the agitator elements being secured to the baffle body in an interference fit connection.

10. The assembly of claim 1, wherein the connector comprises a hub integrated into a wall of the mixing vessel, a glass-coated interior of the hub as said tubular portion being engaged with an external glass-coated surface of the hollow end of said baffle.

11. The assembly of claim 10, wherein an axial extension of the hub lies substantially inside or outside of said vessel wall.

12. The assembly of claim 11, wherein one or more agitator elements are disposed on said elongate baffle, the agitator elements being secured to the baffle body in an interference fit connection.

13. The assembly of claim 10, wherein one or more agitator elements are disposed on said elongate baffle, the agitator elements being secured to the baffle body in an interference fit connection.

14. The assembly of claim 1, wherein the baffle comprises an inner glass-coated tube coaxially arranged within an outer glass-coated tube, a glass-coated hollow end of the outer tube engaging with said connector.

15. The assembly of claim 14, wherein the baffle is provided with measuring devices including at least one of a temperature sensing device, a sample taking device and a pH measuring device.

16. The assembly of claim 15, wherein connection wires for measuring devices provided on or in the baffle are incorporated in the glass coating of the baffle.

17. The assembly of claim 15, wherein one or more agitator elements are disposed on said elongate baffle, the agitator elements being secured to the baffle body in an interference fit connection.

18. The assembly of claim 14, wherein connection wires for measuring devices provided on or in the baffle are incorporated in the glass coating of the baffle.

19. The assembly of claim 14, wherein one or more agitator elements are disposed on said elongate baffle, the agitator elements being secured to the baffle body in an interference fit connection.

20. The assembly of claim 1, wherein one or more agitator elements are disposed on said elongate baffle, the agitator elements being secured to the baffle body in an interference fit connection.

* * * * *